(12) United States Patent
Sawaki et al.

(10) Patent No.: US 8,760,604 B2
(45) Date of Patent: Jun. 24, 2014

(54) POLARIZING ELEMENT, LIQUID CRYSTAL DEVICE, AND ELECTRONIC APPARATUS

(75) Inventors: Daisuke Sawaki, Shiojiri (JP);
Nobuhiko Kenmochi, Suwa (JP);
Noriko Kenmochi, legal representative, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 40 days.

(21) Appl. No.: 13/535,977

(22) Filed: Jun. 28, 2012

(65) Prior Publication Data

US 2013/0002998 A1    Jan. 3, 2013

(30) Foreign Application Priority Data

Jun. 30, 2011  (JP) .................................. 2011-146017
Jun. 30, 2011  (JP) .................................. 2011-146018

(51) Int. Cl.
*G02F 1/1335* (2006.01)

(52) U.S. Cl.
USPC ......................................................... 349/97

(58) Field of Classification Search
USPC ......................................................... 349/97
See application file for complete search history.

(56) References Cited

U.S. PATENT DOCUMENTS

| 4,304,584 | A | 12/1981 | Borrelli et al. |
| 5,943,156 | A | 8/1999 | Komuro et al. |
| 6,221,543 | B1* | 4/2001 | Guehler et al. ................... 430/7 |
| 7,019,903 | B2 | 3/2006 | Berger et al. |
| 2004/0095644 | A1* | 5/2004 | Berger et al. ................. 359/490 |

FOREIGN PATENT DOCUMENTS

| JP | 56-169140 | 12/1981 |
| JP | 11-14829 | 1/1999 |
| JP | 11-258414 | 9/1999 |
| JP | 2004-523804 | 8/2004 |
| JP | 2004-256915 | 9/2004 |

\* cited by examiner

*Primary Examiner* — Phu Vu
(74) *Attorney, Agent, or Firm* — Workman Nydegger

(57) ABSTRACT

A polarizing element includes a plurality of polarizing sections, wherein a first polarizing section included in the plurality of polarizing sections has a first base material and a plurality of first acicular particles dispersed in the first base material such that long axes of the first acicular particles are aligned in substantially the same direction, a second polarizing section included in the plurality of polarizing sections has a second base material and a plurality of second acicular particles dispersed in the second base material such that long axes of the second acicular particles are aligned in substantially the same direction, and the specification of the first acicular particles is different from that of the second acicular particles.

13 Claims, 9 Drawing Sheets

POLARIZING ELEMENT, LIQUID CRYSTAL DEVICE, AND ELECTRONIC APPARATUS

The entire disclosure of Japanese Patent Application No.: 2011-146017, filed Jun. 30, 2011 and 2011-146018, filed Jun. 30, 2011 are expressly incorporated by reference herein.

BACKGROUND

1. Technical Field

The present invention relates to a polarizing element, a liquid crystal device, and an electronic apparatus.

2. Related Art

As one type of polarizing element, a polarizing glass is known. A polarizing glass can be composed only of an inorganic substance, and therefore, as compared with a polarizing plate containing an organic substance, the deterioration thereof due to light is significantly less. Therefore, a polarizing glass has drawn attention as an effective optical device in a liquid crystal projector whose brightness has been enhanced recently.

As a general polarizing glass, those described in JP-A-56-169140 are known, and a method for producing such a polarizing glass is as follows.

(1) A glass product having a desired shape is produced from a composition containing silver and at least one halide selected from the group consisting of chlorides, bromides, and iodides.

(2) The produced glass product is heated to a temperature which is higher than the strain point but not higher than the softening point of the glass by about 50° C. for a period of time sufficient to produce crystals of AgCl, AgBr, or AgI in the glass product, whereby a crystal-containing product is produced.

(3) The resulting crystal-containing product is elongated under stress at a temperature which is higher than the annealing point but lower than a temperature at which the glass has a viscosity of about 108 poises so that the crystals are elongated to have an aspect ratio of at least 5:1.

(4) The elongated product is exposed to a reducing atmosphere at a temperature which is higher than about 250° C. but not higher than the annealing point of the glass by about 25° C. for a period of time sufficient to develop a chemically reduced surface layer on the product. By this process, at least a portion of the elongated silver halide particles are reduced to elemental silver.

According to the production method described in JP-A-56-169140, the halide deposits uniformly in the glass product, but, in the reducing step, only the halide which is contained in the surface layer of the glass product can be reduced. Therefore, the halide remains in a central portion in the thickness direction of the glass product. Due to this, the transmittance of a polarizing element is decreased, and when the polarizing element is applied to a liquid crystal display device or the like, there is a possibility that a sufficient brightness cannot be obtained.

Many of the liquid crystal display devices capable of full-color display in the related art are provided with a color filter comprising a plurality of color material layers of, for example, red (R), green (G), and blue (B). In general, the polarization property of the polarizing element depends on the wavelength, and when one piece of polarizing element is used, the polarization properties with respect to red light, green light, and blue light are different. Therefore, a polarizing element having polarization properties averaged for red light, green light, and blue light was usually used. In other words, the polarization properties of the polarizing element were not optimized for each of red light, green light, and blue light. As a result, the liquid crystal display devices in the related art had a problem that sufficient brightness and contrast, and color reproducibility cannot be obtained.

JP-A-2004-256915 only describes that nanoparticles having an absorption wavelength peak in the visible range are used as a coating material, and the application thereof to a polarizing element is not suggested therein.

SUMMARY

An advantage of some aspects of the invention is to provide a polarizing element exhibiting excellent polarization properties with respect to light of a plurality of colors. Another advantage of some aspects of the invention is to provide a liquid crystal device having an excellent display quality using such a polarizing element. Still another advantage of some aspects of the invention is to provide an electronic apparatus provided with such a liquid crystal device.

An aspect of the invention is directed to a polarizing element including a plurality of polarizing sections, wherein a first polarizing section included in the plurality of polarizing sections has a first base material and a plurality of first acicular particles dispersed in the first base material such that a long axis of each of the plurality of first acicular particles is aligned nearly in a first predetermined direction, a second polarizing section included in the plurality of polarizing sections has a second base material and a plurality of second acicular particles dispersed in the second base material such that a long axis of each of the plurality of second acicular particles is aligned nearly in a second predetermined direction, and a specification of one of the plurality of first acicular particles is different from a specification of one of the plurality of second acicular particles.

In the polarizing element according to the aspect of the invention, by appropriately selecting the specification of the plurality of acicular particles contained in the first polarizing section and the specification of the plurality of acicular particles contained in the second polarizing section, the polarization properties with respect to each color light in a different wavelength range can be improved. As a result, when the polarizing element according to the aspect of the invention is used in a liquid crystal device, the display quality can be increased.

The polarizing element according to the aspect of the invention may be configured such that the specification of one of the plurality of first acicular particles is set according to light in a first wavelength range, and the specification of one of the plurality of second acicular particles is set according to light in a second wavelength range different from the first wavelength range.

According to this configuration, since the specification of the first acicular particles is set according to light in a first wavelength range, and the specification of the second acicular particles is set according to light in a second wavelength range different from the first wavelength range, even when color light in a different wavelength range is incident on each polarizing section, the polarization properties of each polarizing section can be further improved.

The polarizing element according to the aspect of the invention maybe configured such that the first polarizing section has a first light absorbing material which absorbs light in a wavelength range different from a first wavelength range, the second polarizing section has a second light absorbing material which absorbs light in a wavelength range different from a second wavelength range, and the second wavelength range is different from the first wavelength range.

According to this configuration, by appropriately selecting the first wavelength range and the second wavelength range, the polarization properties with respect to each color light in a different wavelength range can be improved. As a result, when the polarizing element according to the aspect of the invention is used in a liquid crystal device, the display quality can be increased.

The polarizing element according to the aspect of the invention may be configured such that the polarizing element further includes a backing material which supports the plurality of polarizing sections, and a plurality of polarizing section groups each composed of the first polarizing section and the second polarizing section is arranged in a matrix on a surface of the backing material.

According to this configuration, for example, when the polarizing element is applied to a configuration in which pixels containing a plurality of subpixels are arranged in a matrix as a liquid crystal device, the polarization properties can be further increased.

The polarizing element according to the aspect of the invention may be configured such that red light is incident on the first polarizing section, green light is incident on the second polarizing section, and the plurality of polarizing sections further includes a third polarizing section on which blue light is incident.

According to this configuration, a preferred polarizing element can be realized when being used in, for example, a liquid crystal device having red pixels, green pixels, and blue pixels.

The polarizing element according to the aspect of the invention maybe configured such that the third polarizing section included in the plurality of polarizing sections has a third light absorbing material which absorbs light in a wavelength range different from a third wavelength range, and the first wavelength range corresponds to red light, the second wavelength range corresponds to green light, and the third wavelength range corresponds to blue light.

According to this configuration, a preferred polarizing element can be realized when being used in, for example, a liquid crystal device having red pixels, green pixels, and blue pixels.

The polarizing element according to the aspect of the invention may be configured such that the specification is at least one of a material, a distribution density, a diameter, and a dimension in the long axis direction.

According to this configuration, by appropriately selecting and setting at least one of a material, a distribution density, a diameter, and a dimension in the long axis direction as the specification, the polarization properties with respect to each color light in a different wavelength range can be optimized. As a result, when the polarizing element according to the aspect of the invention is used in a liquid crystal device, the display quality can be increased.

Another aspect of the invention is directed to a liquid crystal device including: a liquid crystal panel having a liquid crystal layer sandwiched between a pair of substrates; a color filter; and at least one polarizing element, wherein the polarizing element according to the above aspect of the invention is used as the polarizing element.

Since the liquid crystal device according to the aspect of the invention includes the polarizing element according to the aspect of the invention, a liquid crystal device having an excellent display quality can be realized.

Still another aspect of the invention is directed to a liquid crystal device including: a first pixel corresponding to a first color; a second pixel corresponding to a second color; a first polarizing section provided corresponding to the first pixel; a second polarizing section provided corresponding to the second pixel; a plurality of first acicular particles included in the first polarizing section; and a plurality of second acicular particles included in the second polarizing section; wherein the specification of the plurality of first acicular particles is different from the specification of the plurality of second acicular particles.

According to this configuration, the liquid crystal device includes: a first pixel corresponding to a first color; a second pixel corresponding to a second color; a first polarizing section provided corresponding to the first pixel; a second polarizing section provided corresponding to the second pixel; a plurality of first acicular particles constituting the first polarizing section; and a plurality of second acicular particles constituting the second polarizing section, and the specification of the plurality of first acicular particles is different from that of the plurality of second acicular particles, and therefore, the polarization properties with respect to the first color and the second color can be optimized. Accordingly, a liquid crystal device having an excellent display quality can be realized.

Yet another aspect of the invention is directed to an electronic apparatus including the liquid crystal device according the aspect of the invention.

Since the electronic apparatus according to the aspect of the invention includes the liquid crystal device according the aspect of the invention, an electronic apparatus including a liquid crystal display section having an excellent display quality can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described.

Figure 1:
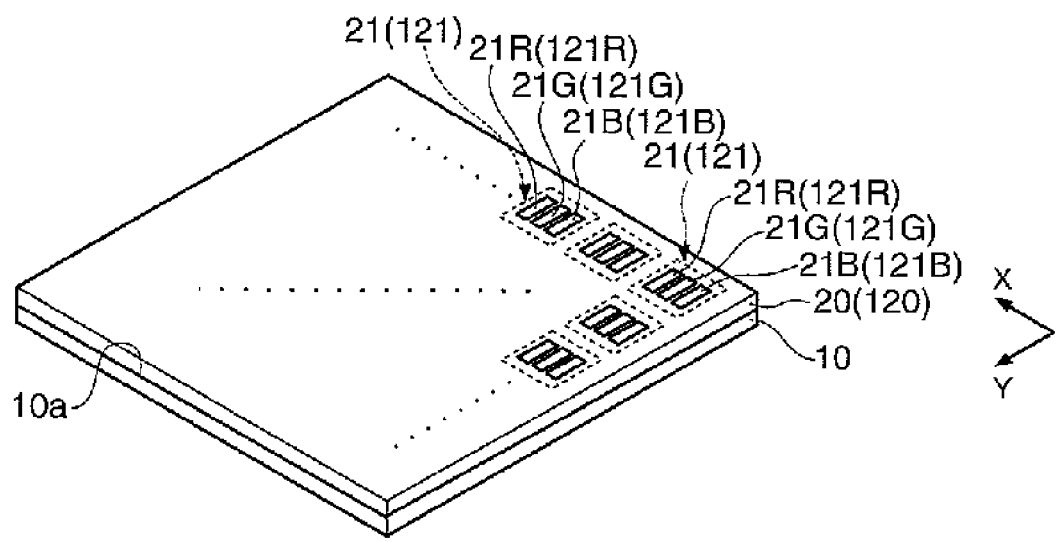
FIG. 1 is a perspective view showing a structure of a polarizing element according to a first embodiment of the invention.

FIG. 1 is a perspective view showing a polarizing element 20 according to a first embodiment. In the following drawings, the scale of each constituent member is sometimes modified as appropriate for illustrating the constituent member at a recognizable size.

As shown in FIG. 1, the polarizing element 20 is supported by a glass substrate 10 serving as a backing material. The polarizing element 20 is used by being bonded to, for example, a display surface or the like of a liquid crystal panel having a plurality of pixels made up of a plurality of subpixels.

A specific material of the glass substrate 10 is not particularly limited, and any known glass substrate maybe used. Incidentally, the material of the glass substrate 10 is not particularly limited to a glass substrate as long as it is a substrate having light transmittance, and a quartz substrate, a rock crystal substrate, a sapphire substrate, a resin substrate, or the like may be used. When the polarizing element 20 is required to have heat resistance, it is preferred to use an inorganic substrate.

The polarizing element 20 is provided on one surface 10a of the glass substrate 10. The polarizing element 20 transmits polarized light in a specific polarized state and also has a property of absorbing polarized light in another polarized states.

The polarizing element 20 includes a plurality of polarizing sections. The plurality of polarizing sections includes a plurality of polarizing sections 21R, a plurality of polarizing sections 21G, and a plurality of polarizing sections 21B. As shown in FIG. 1, one polarizing section group 21 is formed of one polarizing section 21R, one polarizing section 21G, and one polarizing section 21B. The polarizing section 21R corresponds to the first polarizing section, the polarizing section 21G corresponds to the second polarizing section and the polarizing section 21B corresponds to the third polarizing section. Accordingly, a plurality of polarizing section groups 21 is arranged in a matrix in the polarizing element 20. In the respective polarizing section groups 21, the plurality of polarizing sections 21R, 21G, and 21B are arranged side by side in a direction parallel to one surface 10a of the glass substrate 10 are formed.

Figure 2:
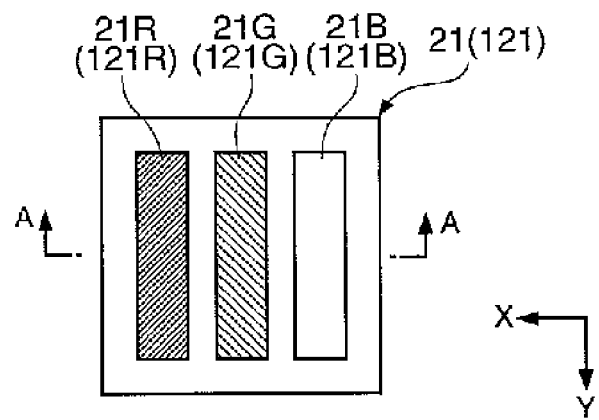
FIG. 2 is a plan view showing a partial structure of the polarizing element according to the first embodiment.

FIG. 2 is a plan view showing a structure of one polarizing section group 21 of the polarizing element 20.

As shown in FIG. 2, the polarizing sections 21R, 21G, and 21B each have a rectangular shape and are formed lengthwise in one direction. The short side direction of the polarizing section 21R is taken as an x-axis direction, and the long side direction thereof is taken as a y-axis direction. The polarizing sections 21R, 21G, and 21B are arranged in a row at the same pitch. That is, the polarizing sections 21R, 21G, and 21B are arranged side by side in the short side direction. The polarizing sections 21R, 21G, and 21B have the same shape and the same dimension. As the arrangement and dimension of the polarizing sections 21R, 21G, and 21B, for example, the arrangement and dimension corresponding to those of subpixels of a liquid crystal panel to which the polarizing element 20 is to be bonded can be adopted.

Figure 3:
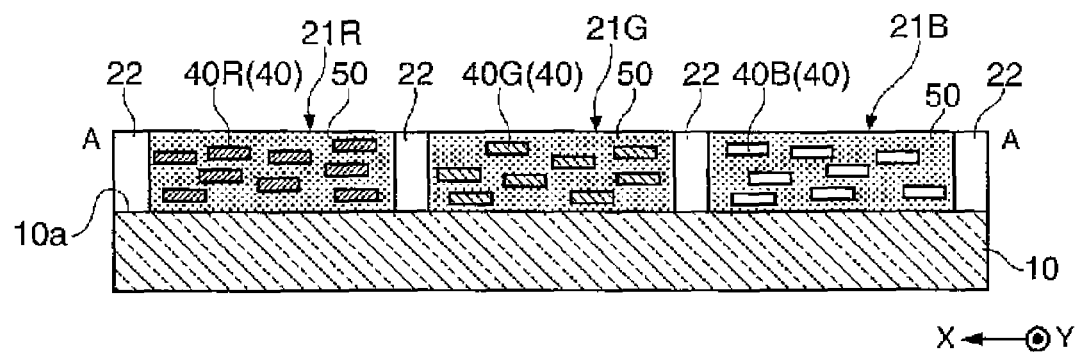
FIG. 3 is a cross-sectional view showing a partial structure of the polarizing element according to the first embodiment.

FIG. 3 is a cross-sectional view taken along the line A-A in FIG. 2.

As shown in FIG. 3, the polarizing sections 21R, 21G, and 21B are configured such that in a light-transmissive base material 50 made mainly of an inorganic material, for example, a base material 50 made of silicon oxide, a plurality of nanorods 40 (acicular particles) made of gold (Au), silver (Ag), or the like are dispersed. In the polarizing section group 21, a partition wall 22 is formed. The partition wall 22 is formed so as to divide the polarizing sections 21R, 21G, and 21B. As a material of the partition wall 22, for example, an inorganic material, an organic material, or the like can be used as appropriate.

Each nanorod 40 has a dimension in a short axis direction of, for example, from about several nanometers to several tens nanometers and a dimension in a long axis direction of, for example, from about several tens nanometers to 100 nm. The absorption property of the nanorod 40 with respect to a polarized light component whose vibration direction is parallel to the short axis direction of the nanorod 40 is different from the absorption property of the nanorod 40 with respect to a polarized light component whose vibration direction is parallel to the long axis direction of the nanorod 40. In this embodiment, as described below, the specification including at least one of a material, a distribution density, a diameter, and a dimension in the long axis direction of the nanorod 40 is set for each of the polarizing sections 21R, 21G, and 21B.

In this embodiment, as the nanorods 40, a gold core-silver shell nanorod 40R, a gold nanorod 40G, and a silver nanorod 40B are used. The nanorod 40R corresponds to the first nanorod, the nanorod 40G corresponds to the second nanorod and the nanorod 40B corresponds to the third nanorod. The gold core-silver shell nanorod 40R is made of such a composite metal that the surface of an acicular crystal composed of gold (a first metal) is coated with silver (a second metal). On the other hand, the silver nanorod 40B is made of silver alone, and the gold nanorod 40G is made of gold alone.

In this embodiment, the gold core-silver shell nanorod 40R is placed inside the polarizing section 21R, the gold nanorod 40G is placed inside the polarizing section 21G, and the silver nanorod 40B is placed inside the polarizing section 21B. The three types of nanorods 40 are aligned in substantially the same direction, that is, in the direction parallel to the principal surface of the glass substrate 10 (an x-y plane) and also in the direction parallel to the x-axis.

These three types of nanorods 40 have absorption peak wavelengths different from one another. The gold core-silver shell nanorod 40R has an absorption peak wavelength at 650 nm (a red wavelength range) with respect to a polarized light component whose vibration direction is parallel to the long axis direction. The gold core-silver shell nanorod 40R absorbs the polarized light component whose vibration direction is parallel to the long axis direction with respect mainly to light in the red wavelength range and exhibits a property of transmitting a polarized light component whose vibration direction is parallel to the short axis direction.

The gold nanorod 40G has an absorption peak wavelength at 530 nm (a green wavelength range) with respect to a polarized light component whose vibration direction is parallel to the short axis direction. The gold nanorod 40G absorbs the polarized light component whose vibration direction is parallel to the short axis direction with respect mainly to light in the green wavelength range and exhibits a property of transmitting a polarized light component whose vibration direction is parallel to the long axis direction.

The silver nanorod 40B has an absorption peak wavelength at 410 nm (a blue wavelength range) with respect to a polarized light component whose vibration direction is parallel to the short axis direction. The silver nanorod 40B absorbs the polarized light component whose vibration direction is parallel to the short axis direction with respect mainly to light in the blue wavelength range and exhibits a property of transmitting a polarized light component whose vibration direction is parallel to the long axis direction.

An example of the size of each nanorod 40 is as follows: the gold core-silver shell nanorod 40R has a dimension in the long axis direction of, for example, 24 nm, a dimension in the short axis direction of, for example, 12 nm, and an aspect ratio of 2; the gold nanorod 40G has a dimension in the long axis direction of, for example, 15 nm, a dimension in the short axis direction of, for example, 5 nm, and an aspect ratio of 3; and the silver nanorod 40B has a dimension in the long axis direction of, for example, 40 nm, a dimension in the short axis direction of, for example, 5 nm, and an aspect ratio of 8. Incidentally, the aspect ratio refers to a ratio of the dimension in the long axis direction to the dimension in the short axis direction of the nanorod 40.

As described above, the silver nanorod 40B and the gold nanorod 40G are different from the gold core-silver shell nanorod 40R with respect to the vibration direction of the polarized light component for which each of the nanorods has an absorption peak wavelength. Accordingly, when the silver nanorod 40B, the gold nanorod 40G, and the gold core-silver shell nanorod 40R are aligned in the same direction in the polarizing element 20, the blue light and the green light are different from the red light with respect to the vibration direction of the polarized light component transmitted through the polarizing element 20.

However, in the case where this polarizing element 20 is applied to a liquid crystal device, when the polarizing element 20 according to this embodiment is used both on the light incident side and on the light exit side of a liquid crystal panel, only a polarized state in the liquid crystal panel is different, and there is no problem with the display, even if the blue light, the green light, and the red light are different with respect to the transmitted polarized light component.

In this manner, the specification of the gold core-silver shell nanorod 40R is selected according to color light corresponding to the polarizing section 21R or color light incident on the polarizing section 21R. Further, the specification of the gold nanorod 40G is selected according to color light corresponding to the polarizing section 21G or color light incident on the polarizing section 21G. Further, the specification of the silver nanorod 40B is selected according to color light corresponding to the polarizing section 21B or color light incident on the polarizing section 21B. Namely, the specification of the one of the plurality of first acicular particles is different from the specification of the one of the plurality of second acicular particles in at least one of a material, a distribution density, a diameter, and a dimension in the long axis direction Here, a value obtained by dividing the transmittance of a polarized light component transmitted by the polarizing section 21R with respect to light in a predetermined wavelength range by the transmittance of a polarized light component to be blocked by the polarizing section 21R is defined as the extinction ratio of the polarizing section 21R with respect to the light at a predetermined wavelength. Also, the extinction ratios of the polarizing sections 21G and 21B are defined in the same manner.

The polarizing element 20 according to this embodiment is configured such that, in the red wavelength range, the extinction ratio of the polarizing section 21R is larger than the extinction ratios of the polarizing sections 21G and 21B. Further, in the green wavelength range, the extinction ratio of the polarizing section 21G is larger than the extinction ratios of the polarizing sections 21R and 21B. Further, in the blue wavelength range, the extinction ratio of the polarizing section 21B is larger than the extinction ratios of the polarizing sections 21R and 21G.

Therefore, even when color light in a different wavelength range is incident on each of the polarizing sections 21R, 21G, and 21B, the polarization properties of each of the polarizing sections 21R, 21G, and 21B can be improved as compared with polarizing elements in the related art.

Subsequently, with reference to FIGS. 4 to 7, a process for producing the polarizing element 20 according to this embodiment will be described.

FIGS. 4 to 7 are process drawings showing a process for producing the polarizing element 20 having the above-described configuration.

Figure 4:
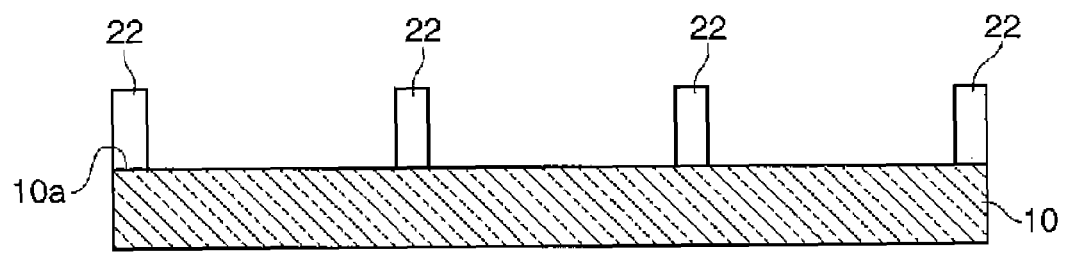
FIG. 4 is a process drawing showing a process for producing the polarizing element according to the first embodiment.

First, as shown in FIG. 4, the partition wall 22 is formed on the glass substrate 10. The partition wall 22 is formed so as to divide regions forming the polarizing sections 21R, 21G, and 21B. The partition wall 22 can be formed by patterning through, for example, a photolithography method, an etching method, or the like. It is a matter of course that the partition wall 22 is formed by other methods.

Figure 5:
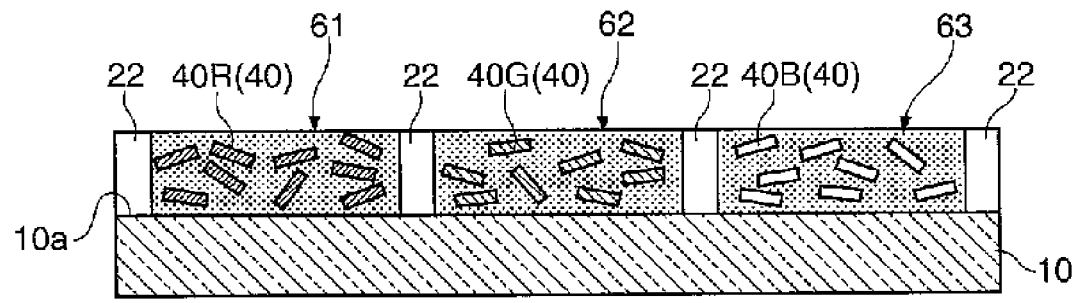
FIG. 5 is a process drawing showing the process for producing the polarizing element according to the first embodiment.

After the partition wall 22 is formed on the glass substrate 10, as shown in FIG. 5, in regions surrounded by the partition wall 22 on the glass substrate 10, an organic solvent solution 61 containing the gold core-silver shell nanorods 40R, an organic solvent solution 62 containing the gold nanorods 40G, and an organic solvent solution 63 containing the silver nanorods 40B are applied, respectively (an application step). In this application step, for example, a liquid ejection method can be used.

Each of the organic solvent solutions 61 to 63 is obtained by dissolving polysilazane which is a starting material of silicon oxide in an arbitrary organic solvent. At the stage of completion of the application of the organic solvent solutions 61 to 63, the gold core-silver shell nanorods 40R, the gold nanorods 40G, and the silver nanorods 40B face in random directions.

Figure 6:
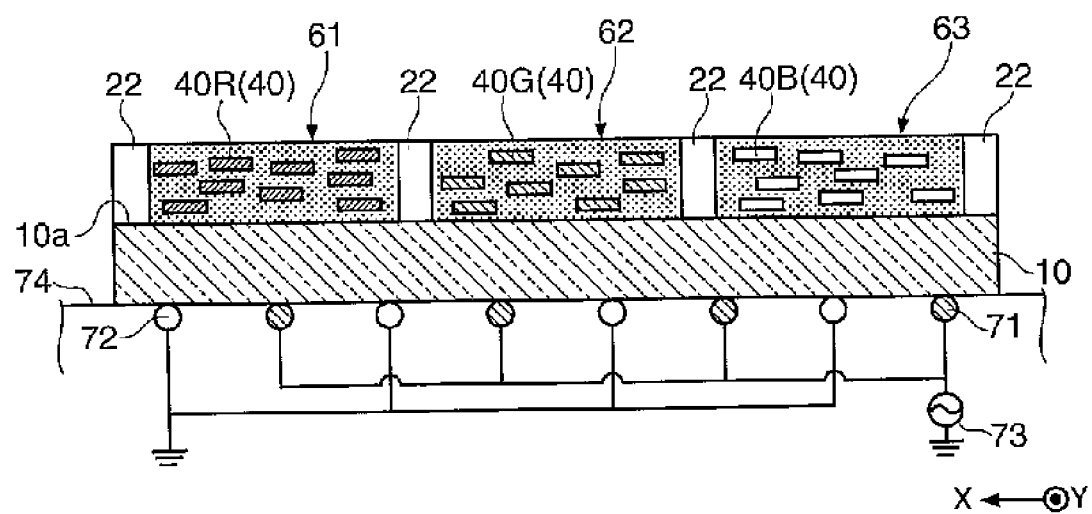
FIG. 6 is a process drawing showing the process for producing the polarizing element according to the first embodiment.

Subsequently, as shown in FIG. 6, an electric field is applied to the organic solvent solutions 61 to 63 in the direction parallel to the x-axis (an electric field application step). At this time, the glass substrate 10 is placed on a stage 74 in which a plurality of first electrodes 71 and a plurality of second electrodes 72 are arranged alternately. Although not shown in FIG. 6, the first electrodes 71 and the second electrodes 72 extend in the y-axis direction. To the first electrodes 71, a high-frequency power source 73 is connected, and the second electrodes 72 are connected to ground.

When a high-frequency power voltage is applied between the first electrodes 71 and the second electrodes 72 in this state, an electric field in the direction parallel to the x-axis is generated inside the organic solvent solutions 61 to 63. All of the gold core-silver shell nanorods 40R, the gold nanorods 40G, and the silver nanorods 40B have an acicular shape, and polarization is generated in each nanorod 40. As a result, each nanorod 40 is aligned such that the long axis direction thereof is parallel to the direction of the electric field.

Figure 7:
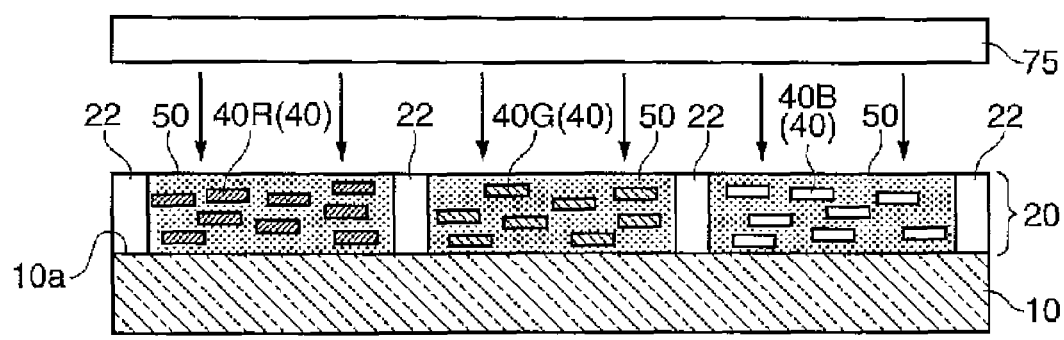
FIG. 7 is a process drawing showing the process for producing the polarizing element according to the first embodiment.

Subsequently, as shown in FIG. 7, for example, by using an oven 75 or the like, the organic solvent solutions 61 to 63 are fired (a firing step). By doing this, the organic solvents in the organic solvent solutions 61 to 63 are removed and also polysilazane is reacted with water or oxygen in air and solidified and converted into silicon oxide (the base material 50). At this time, the solidification is achieved in a state where the gold core-silver shell nanorods 40R, the gold nanorods 40G, and the silver nanorods 40B are aligned in substantially the same direction.

Through the above-described steps, the polarizing element 20 according to this embodiment is completed.

Polarizing elements in the related art generally have polarization properties with respect to light in a broad wavelength range, and the polarization properties are not optimized for each color light. Therefore, for example, when a polarizing element in the related art was used in a liquid crystal device, a display failure such as a decrease in brightness or contrast or deterioration of color reproducibility occurred. Further, it is extremely difficult to produce a polarizing element having high polarization properties with respect to each color light in a different wavelength range by cutting a polarizer in the related art into minute pieces and arranging the pieces on a given plane surface.

On the other hand, the polarizing element 20 according to this embodiment is configured such that the specification including at least one of a material, a distribution density, a diameter, and a dimension in the long axis direction of the nanorods 40 contained in the polarizing element 20 is set for each of the polarizing sections 21R, 21G, and 21B, and therefore, by appropriately selecting and setting such a specification, the polarization properties with respect to each color light in a different wavelength range can be improved. Further, the polarizing element 20 according to this embodiment can be easily produced using a known thin film forming technique as described above, and therefore, the thickness of the polarizing element can be reduced as compared with the polarizing elements in the related art.

Specifically, the gold core-silver shell nanorods 40R, the gold nanorods 40G, and the silver nanorods 40B to be used as the nanorods 40 in this embodiment have an absorption peak wavelength of a specific polarized light component in a red wavelength range, a green wavelength range, and a blue wavelength range, respectively. Therefore, one polarizing element has polarization properties corresponding to the respective color light components: red light, green light, and blue light. As a result, when the polarizing element 20 of this embodiment is used in a liquid crystal device having a plurality of pixels containing red pixels, green pixels, and blue pixels as subpixels, a decrease in brightness or contrast is reduced, and color reproducibility and the like are improved, and the display quality can be improved.

Further, since all of the constituent materials of the polarizing element 20 are inorganic materials, a polarizing element having excellent heat resistance can be realized.

Second Embodiment

Figure 8:
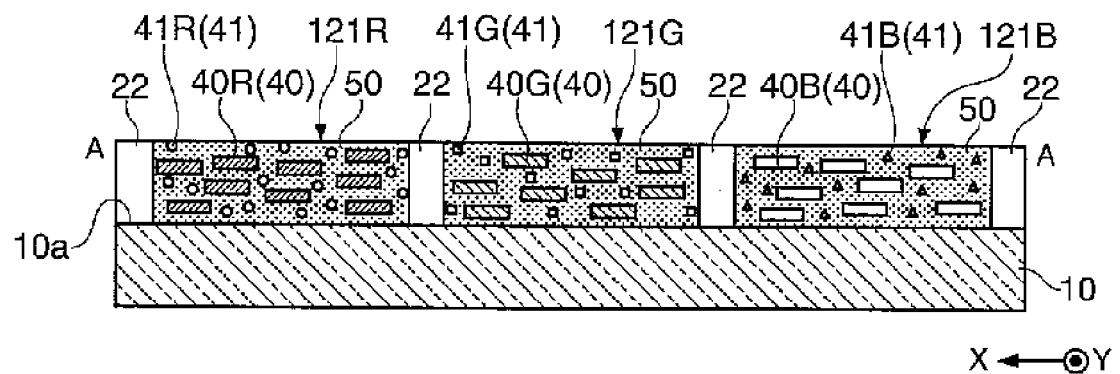
FIG. 8 is a cross-sectional view showing a partial structure of a polarizing element according to a second embodiment.

With reference to FIG. 8, a polarizing element 120 according to a second embodiment of the invention will be described. Incidentally, a point different between the polarizing element 120 according to this embodiment and the polarizing element 20 according to the first embodiment is that each of a polarizing sections 121R, 121G, and 121B provided for the polarizing element 120 contains a light absorbing material, and therefore, the different point will be mainly described. Further, the drawings used for describing the first embodiment will be referred to as appropriate.

As shown in FIG. 1, the polarizing element 120 is supported by a glass substrate 10 serving as a backing material. The polarizing element 120 is used by being bonded to, for example, a display surface or the like of a liquid crystal panel having a plurality of pixels made up of a plurality of subpixels.

FIG. 8 is a cross-sectional view taken along the line A-A in FIG. 2.

As shown in FIG. 8, the polarizing sections 121R, 121G, and 121B are configured such that in a light-transmissive base material 50 made mainly of an inorganic material, for example, a base material 50 made of silicon oxide, a plurality of nanorods 40 (acicular metal particles) made of gold (Au), silver (Ag), or the like and a light absorbing material 41 which absorbs light in a predetermined wavelength range are dispersed.

The light absorbing material 41 includes a red color material 41R contained in the polarizing section 121R, a green color material 41G contained in the polarizing section 121G, and a blue color material 41B contained in the polarizing section 121B. As the red color material 41R, the green color material 41G, and the blue color material 41B, for example, a dye, a pigment, or the like can be used. Further, the red color material 41R, the green color material 41G, and the blue color material 41B are each not limited to one substance, and a plurality of substances may be used in combination.

Examples of the dye include azo dyes, anthraquinone dyes, condensed polycyclic aromatic carbonyl dyes, indigoid dyes, carbonium dyes, phthalocyanine dyes, methines, and polymethine dyes.

Examples of the pigment include C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:1, 48:2, 48:3, 48:4, 49:1, 49:2, 50:1, 52:1, 53:1, 57, 57:1, 57:2, 58:2, 58:4, 60:1, 63:1, 63:2, 64:1, 81, 81:1, 83, 88, 90:1, 97, 101, 102, 104, 105, 106, 108, 108:1, 112, 113, 114, 122, 123, 144, 146, 149, 150, 151, 166, 168, 170, 171, 172, 174, 175, 176, 177, 178, 179, 180, 185, 187, 188, 190, 193, 194, 202, 206, 207, 208, 209, 215, 216, 220, 224, 226, 242, 243, 245, 254, 255, 264, and 265; C.I. pigment green 7, 36, 15, 17, 18, 19, 26, 50, and 58; C.I. pigment blue 1, 15, 15:1, 15:2, 15:3, 15:4, 15:6, 17:1, 18, 60, 27, 28, 29, 35, 36, 60, and 80; C.I. pigment yellow 1, 3, 12, 13, 14, 15, 16, 17, 20, 24, 31, 34, 35, 35:1, 37, 37:1, 42, 43, 53, 55, 60, 61, 65, 71, 73, 74, 81, 83, 93, 94, 95, 97, 98, 100, 101, 104, 106, 108, 109, 110, 113, 114, 116, 117, 119, 120, 126, 127, 128, 129, 138, 139, 150, 151, 152, 153, 154, 155, 156, 157, 166, 168, 175, 180, 184, and 185; C.I. pigment violet 1, 3, 14, 16, 19, 23, 29, 32, 36, 38, and 50; C.I. pigment orange 1, 5, 13, 14, 16, 17, 20, 20:1, 24, 34, 36, 38, 40, 43, 46, 49, 51, 61, 63, 64, 71, 73, and 104; C.I. pigment brown 7, 11, 23, 25, and 33; C.I. pigment black 1 and 7; and derivatives of these pigments and the like.

Further, as the red color material 41R, the green color material 41G, and the blue color material 41B, for example, metal nanoparticles can also be used. Examples of the metal nanoparticles include gold nanoparticles, silver nanoparticles, copper nanoparticles, gold core-silver shell composite nanoparticles, and gold core-copper shell composite nanoparticles.

As the color material, one type or two or more types in combination selected from these can be used, however, when the color material is required to have high heat resistance, metal nanoparticles may be used.

The red color material 41R absorbs light in a wavelength range different from a first wavelength range, for example, 650 nm (a red wavelength range). Therefore, from the polarizing section 121R, a polarized light component in a red wavelength range is emitted. The green color material 41G absorbs light in a wavelength range different from a second wavelength range, for example, 530 nm (a green wavelength range). Therefore, from the polarizing section 121G, a polarized light component in a green wavelength range is emitted. The blue color material 41B absorbs light in a wavelength range different from a third wavelength range, for example, 410 nm (a blue wavelength range). Therefore, from the polarizing section 121B, a polarized light component in a blue wavelength range is emitted. In this manner, the wavelength range of the light which the light absorbing material 41 absorbs is set for each of the polarizing sections 121R, 121G, and 121B.

In this embodiment, in the same manner as the first embodiment, the gold core-silver shell nanorod 40R is placed inside the polarizing section 121R, the gold nanorod 40G is placed inside the polarizing section 121G, and the silver nanorod 40B is placed inside the polarizing section 121B. The three types of nanorods 40 are aligned in substantially the same direction, that is, in the direction parallel to the principal surface of the glass substrate 10 (an x-y plane) and also in the direction parallel to the x-axis.

These three types of nanorods 40 have absorption peak wavelengths different from one another. The gold core-silver shell nanorod 40R has an absorption peak wavelength in the first wavelength range or in the vicinity of the first wavelength range, for example, at 650 nm (a red wavelength range) with respect to a polarized light component whose vibration direction is parallel to the long axis direction. The gold core-silver shell nanorod 40R absorbs the polarized light component whose vibration direction is parallel to the long axis direction with respect mainly to light in the red wavelength range and exhibits a property of transmitting a polarized light component whose vibration direction is parallel to the short axis direction. In this embodiment, the gold core-silver shell nanorod 40R is contained in the polarizing section 121R containing the red color material 41R, and therefore, this embodiment is configured such that alight component in the red wavelength range can be highly accurately polarized.

The gold nanorod 40G has an absorption peak wavelength in the second wavelength range or in the vicinity of the second wavelength range, for example, at 530 nm (a green wavelength range) with respect to a polarized light component whose vibration direction is parallel to the short axis direction. The gold nanorod 40G absorbs the polarized light component whose vibration direction is parallel to the short axis direction with respect mainly to light in the green wavelength range and exhibits a property of transmitting a polarized light component whose vibration direction is parallel to the long axis direction. In this embodiment, the gold nanorod 40G is contained in the polarizing section 121G containing the green color material 41G, and therefore, this embodiment is configured such that a light component in the green wavelength range can be highly accurately polarized.

The silver nanorod 40B has an absorption peak wavelength in the third wavelength range or in the vicinity of the third wavelength range, for example, at 410 nm (a blue wavelength range) with respect to a polarized light component whose vibration direction is parallel to the short axis direction. The silver nanorod 40B absorbs the polarized light component whose vibration direction is parallel to the short axis direction with respect mainly to light in the blue wavelength range and exhibits a property of transmitting a polarized light component whose vibration direction is parallel to the long axis direction. In this embodiment, the silver nanorod 40B is contained in the polarizing section 121B containing the blue color material 41B, and therefore, this embodiment is configured such that a light component in the blue wavelength range can be highly accurately polarized.

In this manner, in the polarizing section 121R, the red color material 41R corresponding to the wavelength of light incident on the polarizing section 121R is contained, and further, the specification of the gold core-silver shell nanorod 40R is selected according to the wavelength of light incident on the polarizing section 121R.

In the polarizing section 121G, the green color material 41G corresponding to the wavelength of light incident on the polarizing section 121G is contained, and further, the specification of the gold nanorod 40G is selected according to the wavelength of light incident on the polarizing section 121G.

In the polarizing section 121B, the blue color material 41B corresponding to the wavelength of light incident on the polarizing section 121B is contained, and further, the specification of the silver nanorod 40B is selected according to the wavelength of light incident on the polarizing section 121B.

Here, in a state where the red color material 41R is not contained in the polarizing section 121R, a value obtained by dividing the transmittance of a polarized light component transmitted by the polarizing section 121R with respect to light in a predetermined wavelength range by the transmittance of a polarized light component to be blocked by the polarizing section 121R is defined as the extinction ratio of the polarizing section 121R with respect to light at a predetermined wavelength. Also, the extinction ratios of the polarizing sections 121G and 121B are defined in the same manner.

The polarizing element 120 according to this embodiment is configured such that, in the red wavelength range, the extinction ratio of the polarizing section 121R is larger than the extinction ratios of the polarizing sections 121G and 121B. Further, in the green wavelength range, the extinction ratio of the polarizing section 121G is larger than the extinction ratios of the polarizing sections 121R and 121B. Further, in the blue wavelength range, the extinction ratio of the polarizing section 121B is larger than the extinction ratios of the polarizing sections 121R and 121G.

Incidentally, the transmittance of a polarized light component which is not absorbed by the gold core-silver shell nanorod 40R in a predetermined wavelength range can be regarded as the transmittance of a polarized light component which is transmitted by the gold core-silver shell nanorod 40R with respect to light in the predetermined wavelength range. Similarly, the transmittance of a polarized light component which is not absorbed by the gold nanorod 40G in a predetermined wavelength range can be regarded as the transmittance of a polarized light component which is transmitted by the gold nanorod 40G with respect to light in the predetermined wavelength range. Further, the transmittance of a polarized light component which is not absorbed by the silver nanorod 40B in a predetermined wavelength range can be regarded as the transmittance of a polarized light component which is transmitted by the silver nanorod 40B with respect to light in the predetermined wavelength range.

Therefore, even when color light in a different wavelength range is incident on each of the polarizing sections 121R, 121G, and 121B, the polarization properties of each of the polarizing sections 121R, 121G, and 121B can be improved as compared with polarizing elements in the related art.

Subsequently, with reference to FIGS. 9 and 10, a process for producing the polarizing element 120 according to this embodiment will be described. The drawings used for describing the first embodiment will be also referred to as appropriate.

Figure 9:
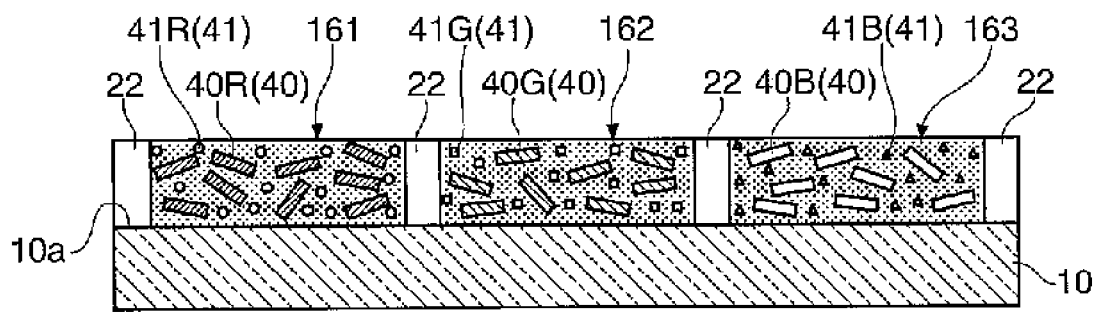
FIG. 9 is a process drawing showing a process for producing the polarizing element according to the second embodiment.
Figure 10:
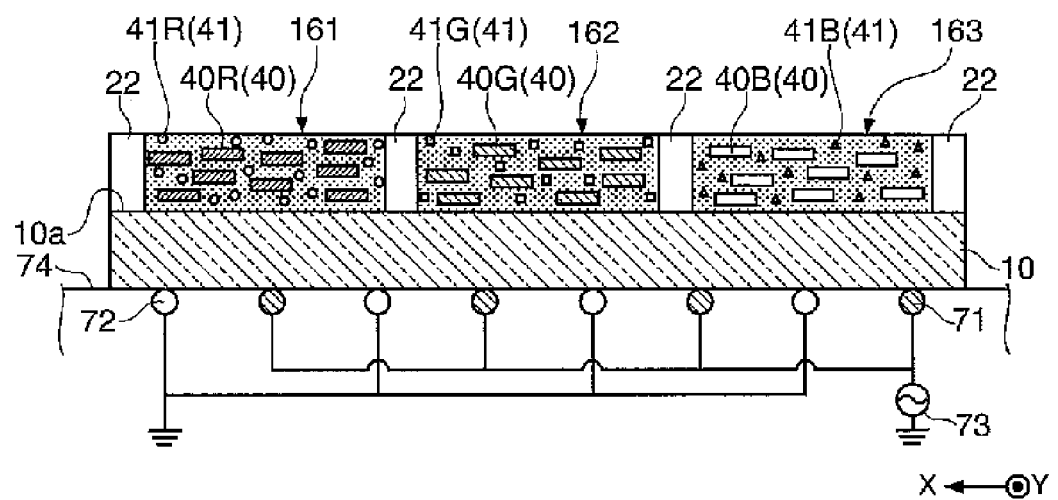
FIG. 10 is a process drawing showing the process for producing the polarizing element according to the second embodiment.

FIGS. 9 and 10 are process drawings showing a process for producing the polarizing element 120 having the above-described configuration.

First, as shown in FIG. 4, the partition wall 22 is formed on the glass substrate 10.

After the partition wall 22 is formed on the glass substrate 10, as shown in FIG. 9, in regions surrounded by the partition wall 22 on the glass substrate 10, an organic solvent solution 161 containing the gold core-silver shell nanorods 40R and the red color material 41R, an organic solvent solution 162 containing the gold nanorods 40G and the green color material 41G, and an organic solvent solution 163 containing the silver nanorods 40B and the blue color material 41B are applied, respectively (an application step).

Each of the organic solvent solutions 161 to 163 is obtained by dissolving polysilazane which is a starting material of silicon oxide in an arbitrary organic solvent. At the stage of completion of the application of the organic solvent solutions 161 to 163, the gold core-silver shell nanorods 40R, the gold nanorods 40G, and the silver nanorods 40B face in random directions.

Subsequently, as shown in FIG. 10, in the same manner as the electric field application step in the first embodiment, an electric field is applied to the organic solvent solutions 161 to 163 in the direction parallel to the x-axis (an electric field application step). As a result, each nanorod 40 is aligned such that the long axis direction thereof is parallel to the direction of the electric field.

Subsequently, as shown in FIG. 7, in the same manner as the firing step in the first embodiment, for example, by using an oven 75 or the like, the organic solvent solutions 161 to 163 are fired (a firing step). By doing this, the organic solvents in the organic solvent solutions 161 to 163 are removed and also polysilazane is reacted with water or oxygen in air and solidified and converted into silicon oxide (the base material 50). At this time, the solidification is achieved in a state where the gold core-silver shell nanorods 40R, the gold nanorods 40G, and the silver nanorods 40B are aligned in substantially the same direction.

Through the above-described steps, the polarizing element 120 according to this embodiment is completed.

Polarizing elements in the related art generally have polarization properties with respect to light in a broad wavelength range, and the polarization properties are not optimized for each color light. Therefore, for example, when a polarizing element in the related art was used in a liquid crystal device, a display failure such as a decrease in brightness or contrast or deterioration of color reproducibility occurred. Further, it is extremely difficult to produce a polarizing element having high polarization properties with respect to each color light in a different wavelength range by cutting a polarizer in the related art into minute pieces and arranging the pieces on a given plane surface.

On the other hand, the polarizing element 120 according to this embodiment is configured such that the wavelength range of light which the light absorbing material absorbs is set for each polarizing section. Therefore, by appropriately selecting the wavelength range of light which the light absorbing material absorbs so as to correspond to the light absorbing property of nanorods contained in the polarizing section, a polarizing element having high polarization properties with respect to color light components in a plurality of wavelength ranges can be realized. Further, the polarizing element 120 according to this embodiment can be easily produced using a known thin film forming technique as described above, and therefore, the thickness of the polarizing element can be reduced as compared with the polarizing elements in the related art.

As a result, when the polarizing element 120 according to this embodiment is used in a liquid crystal device, the display quality can be improved.

Further, in the same manner as the first embodiment, the polarizing element 120 according to this embodiment is configured such that the specification including at least one of a material, a distribution density, a diameter, and a dimension in the long axis direction of the nanorods 40 contained in the polarizing element 120 is set for each of the polarizing sections 121R, 121G, and 121B, and therefore, by appropriately selecting and setting such a specification, the polarization properties with respect to each color light in a different wavelength range can be improved.

In this embodiment, a configuration in which the nanorods 40 (the gold core-silver shell nanorods 40R, the gold nanorods 40G, and the silver nanorods 40B) are contained in the polarizing sections 121R, 121G, and 121B is described by way of example, however, this is not a limitation. For example, a configuration in which the nanorods 40 are not provided may be adopted. In this case, other polarization means may be provided for the polarizing sections 121R, 121G, and 121B.

Further, in the above embodiment, a configuration in which a color material to be used in a color filter is used as the color absorbing material is described by way of example, however, this is not a limitation. For example, a configuration in which by utilizing the light absorbing property of the nanorods 40, plural types of nanorods 40 having a different absorption peak wavelength are appropriately combined so as to correspond to the wavelengths of light incident on the polarizing sections 121R, 121G, and 121B and contained in the polarizing sections 121R, 121G, and 121B may be adopted.

Third Embodiment

Subsequently, a third embodiment of the invention will be described.

Figure 11:
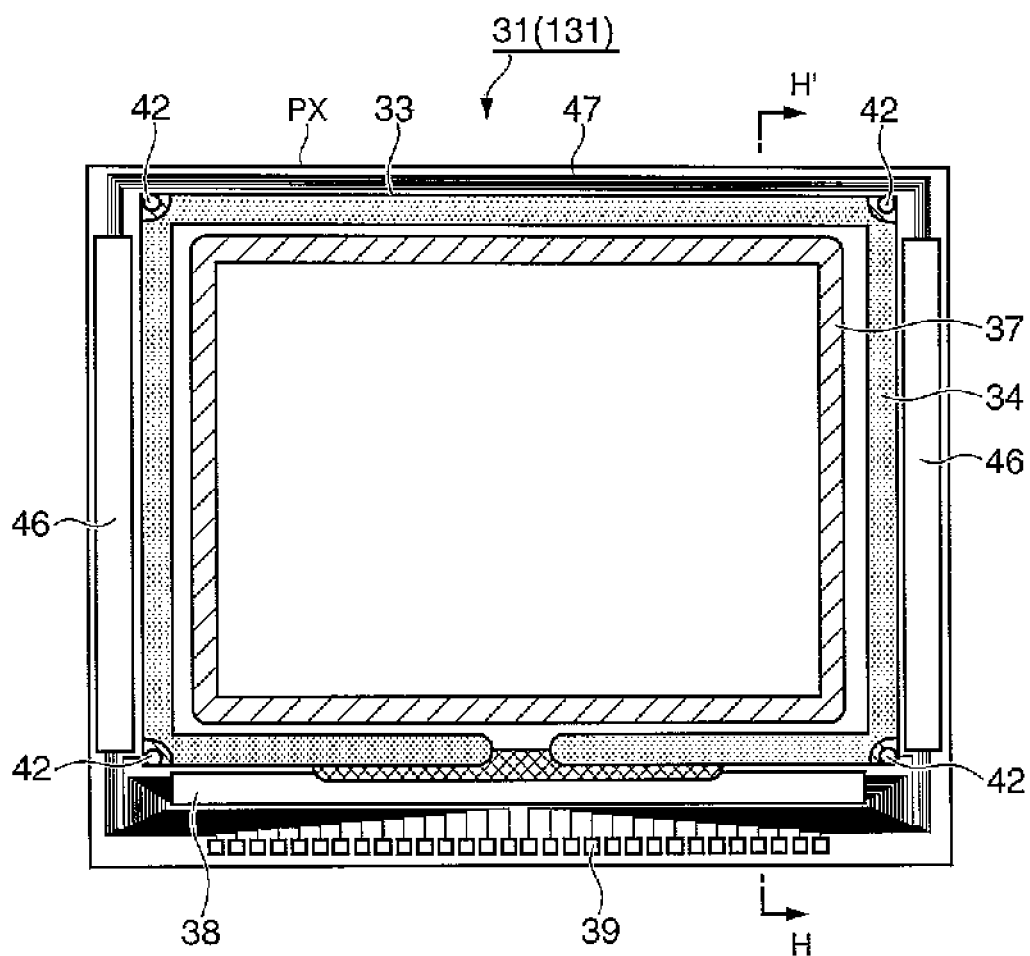
FIG. 11 is a plan view showing a structure of a liquid crystal device according to a third embodiment of the invention.
Figure 12:
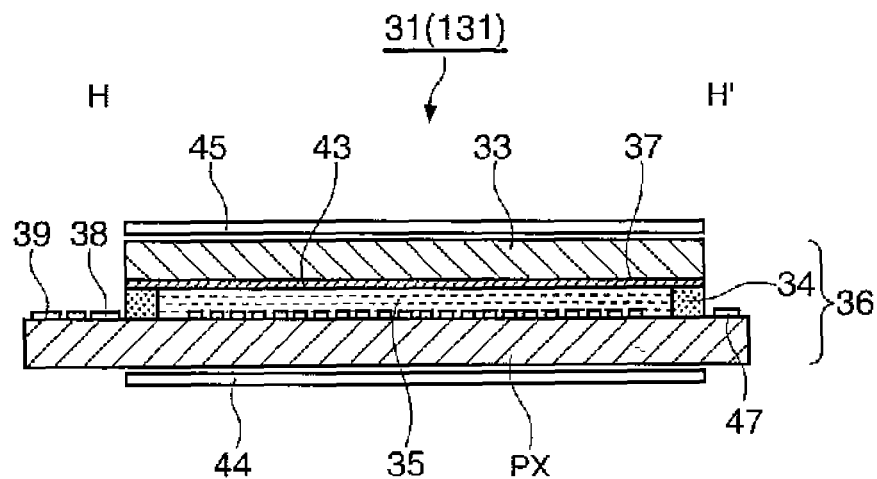
FIG. 12 is a cross-sectional view showing a structure of the liquid crystal device according to the third embodiment.

FIGS. 11 and 12 are views showing a structure of a liquid crystal device according to a third embodiment. In this embodiment, an active matrix type liquid crystal display device using a thin-film transistor (hereinafter abbreviated as "TFT") as a pixel switching element is described by way of example. FIG. 11 is a plan view of a liquid crystal display device according to this embodiment together with each constituent member seen from a counter substrate side, and FIG. 12 is a cross-sectional view taken along the line H-H' in FIG. 11.

As shown in FIGS. 11 and 12, a liquid crystal display device 31 according to this embodiment is provided with a liquid crystal panel 36 in which a TFT array substrate PX and a counter substrate 33 are bonded to each other with a sealing material 34, and a liquid crystal layer 35 is enclosed in a region defined by the sealing material 34. The liquid crystal layer 35 is made of a liquid crystal material with positive dielectric anisotropy. In an area inside the region where the sealing material 34 is formed, a light shielding film (periphery partition portion) 37 made of a light shielding material is formed.

In a peripheral circuit region outside the sealing material 34, a data-line drive circuit 38 and external circuit mounting terminals 39 are formed along one side of the TFT array substrate PX, and scanning-line drive circuits 46 are formed along two sides adjacent to this one side. A plurality of wires 47 for establishing connection between the scanning-line drive circuits 46 provided on both sides of the display region are formed along the remaining one side of the TFT array substrate PX.

Further, an inter-substrate conductive material 42 for establishing electrical connection between the TFT array substrate PX and the counter substrate 33 is arranged at corners of the counter substrate 33. On the surface of the counter substrate 33 on the side of the liquid crystal layer 35, a color filter 43 is formed. On the light incident side and the light exit side of the liquid crystal panel 36, polarizing plates 44 and 45 are disposed, respectively. These polarizing plates 44 and 45 (particularly the polarizing plate 45) are the polarizing elements according to the above embodiment. Incidentally, on the side of the polarizing plate 44, a backlight (not shown) is disposed.

Figure 13:
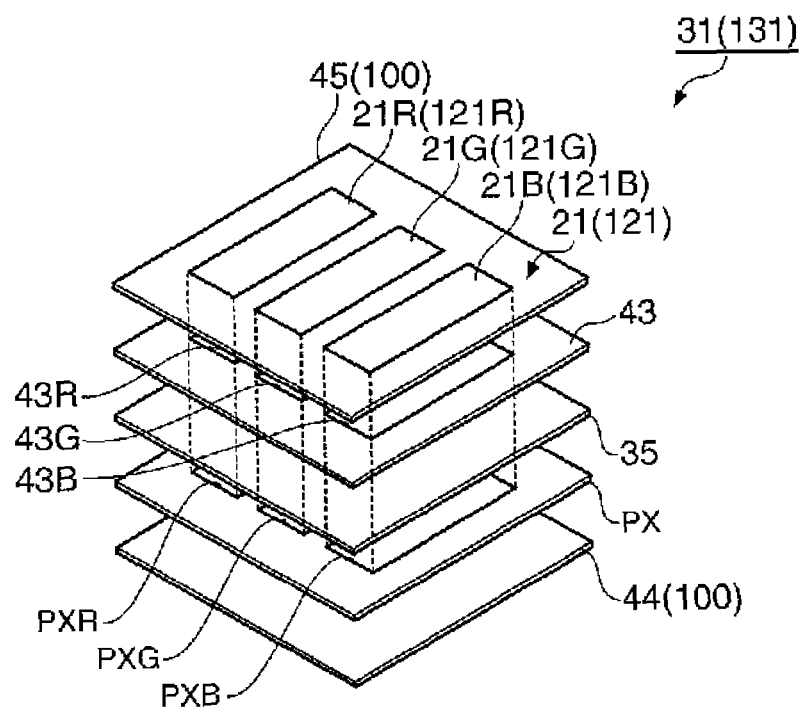
FIG. 13 is a cross-sectional view showing a partial structure of the liquid crystal device according to the third embodiment.

FIG. 13 is an exploded perspective view schematically showing a structure of one pixel of the liquid crystal display device 31.

As shown in FIG. 13, the liquid crystal display device 31 has a plurality of pixels arranged in a matrix and each pixel is made up of a plurality of subpixels (a red subpixel PXR, a green subpixel PXG, and a blue subpixel PXB). The red subpixel PXR, the green subpixel PXG, and the blue subpixel PXB are arranged in a row in one direction at the same pitch in one pixel.

The color filter 43 has a red color material layer 43R, a green color material layer 43G, and a blue color material layer 43B corresponding to the red subpixel PXR, the green subpixel PXG, and the blue subpixel PXB, respectively.

The red color material layer 43R is disposed at a position overlapping with the red subpixel PXR in plan view and formed to have a dimension including the red subpixel PXR. The green color material layer 43G is disposed at a position overlapping with the green subpixel PXG in plan view and formed to have a dimension including the green subpixel PXG. The blue color material layer 43B is disposed at a position overlapping with the blue subpixel PXB in plan view and formed to have a dimension including the blue subpixel PXB.

In the polarizing plate 45 according to this embodiment, the polarizing section 21R is disposed at a position overlapping with the red subpixel PXR in plan view and formed to have a dimension including the red subpixel PXR. The polarizing section 21G is disposed at a position overlapping with the green subpixel PXG in plan view and formed to have a dimension including the green subpixel PXG. The polarizing section 21B is disposed at a position overlapping with the blue subpixel PXB in plan view and formed to have a dimension including the blue subpixel PXB.

Further, the polarizing section 21R is disposed at a position overlapping with the red color material layer 43R in plan view, the polarizing section 21G is disposed at a position overlapping with the green color material layer 43G in plan view, and the polarizing section 21B is disposed at a position overlapping with the blue color material layer 43B in plan view.

In this configuration, light emitted from the backlight (not shown) and transmitted through the red color material layer 43R, the green color material layer 43G, and the blue color material layer 43B is incident on the polarizing sections 21R, 21G, and 21B, respectively. Here, the polarizing sections 21R, 21G, and 21B of the polarizing plate 45 contain nanorods 40, and the specification including at least one of a material, a distribution density, a diameter, and a dimension in the long axis direction of nanorods 40 is set for each of the polarizing sections 21R, 21G, and 21B. Due to this, the liquid crystal display device has such a configuration that the polarization properties are improved for each color light.

For example, the polarizing section 21R corresponding to the red subpixel PXR contains the gold core-silver shell nanorods 40R suitable for red color. Further, the polarizing section 21G corresponding to the green subpixel PXG contains the gold nanorods 40G suitable for green color, and the polarizing section 21B corresponding to the blue subpixel PXB contains the silver nanorods 40B suitable for blue. Due to this, a liquid crystal display device which enables bright and high contrast display can be realized.

Modification Example

In a liquid crystal device, a polarizing element 120 may be used in place of a polarizing element 20. FIG. 11 is a view showing a liquid crystal display device 131 using a polarizing element 120. As shown in FIG. 12, on the light incident side and the light exit side of a liquid crystal panel 36 of a liquid crystal display device 131, polarizing plates 44 and 45 are disposed, respectively. These polarizing plates 44 and 45 (particularly the polarizing plate 45) are the polarizing elements 120 according to the second embodiment. Incidentally, on the side of the polarizing plate 44, a backlight (not shown) is disposed. FIG. 13 is an exploded perspective view schematically showing a structure of one pixel of the liquid crystal display device 131.

In this configuration, light emitted from the backlight (not shown) and transmitted through a red color material layer 43R, a green color material layer 43G, and a blue color material layer 43B is incident on a polarizing section 121R, a polarizing section 121G, and a polarizing section 121B, respectively. Here, the polarizing sections 121R, 121G, and 121B of the polarizing plate 45 contain nanorods 40, and the specification including at least one of a material, a distribution density, a diameter, and a dimension in the long axis direction is set for each of the polarizing sections 121R, 121G, and 121B. Due to this, the liquid crystal display device has such a configuration that the polarization properties are improved for each color light.

For example, the polarizing section 121R corresponding to a red subpixel PXR contains gold core-silver shell nanorods 40R suitable for red color. Further, the polarizing section 121G corresponding to a green subpixel PXG contains gold nanorods 40G suitable for green color, and the polarizing section 121B corresponding to a blue subpixel PXB contains silver nanorods 40B suitable for blue color. Due to this, a liquid crystal display device which enables bright and high contrast display can be realized.

Forth Embodiment

Subsequently, a forth embodiment of the invention will be described.

Figure 14:
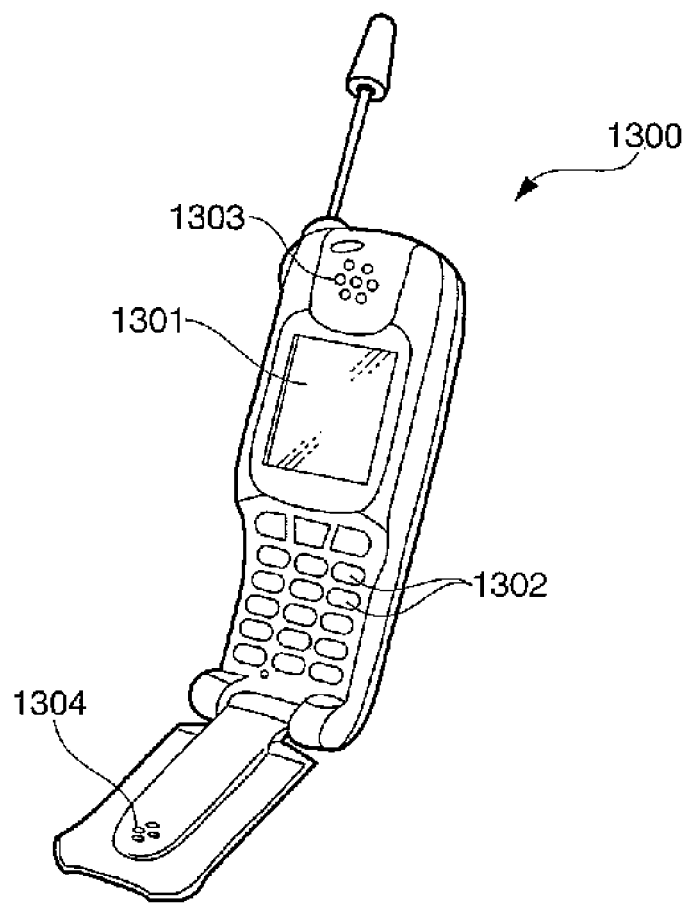
FIG. 14 is a perspective view showing a structure of an electronic apparatus according to a fourth embodiment of the invention.

FIG. 14 is a perspective view showing a structure of a cellular phone according to a fourth embodiment of the invention.

As shown in FIG. 14, a cellular phone 1300 (an electronic apparatus) is provided with a plurality of operation buttons 1302, an earpiece 1303, and a mouthpiece 1304, and also a display section 1301 composed of the liquid crystal display device according to the above embodiment.

Specific examples of the electronic apparatus according to this embodiment include projectors, electronic books, personal computers, digital still cameras, liquid crystal display televisions, view finder type or monitor direct viewing type video tape recorders, car navigators, pagers, electronic notebooks, electronic calculators, word processors, work stations, video phones, POS terminals, and electronic apparatuses provided with a touch panel as well as cellular phones described above.

The technical scope of the invention is not limited to the above embodiments, and various modifications can be made within a range not departing from the gist of the invention.

For example, in the above embodiment, a configuration in which the red subpixel PXR, the green subpixel PXG, and the blue subpixel PXB are contained in one pixel of the liquid crystal display device 31, and the red subpixel PXR, the green subpixel PXG, and the blue subpixel PXB are arranged in a row in one direction at the same pitch in one pixel is described by way of example, however, this is not a limitation.

Figure 15:
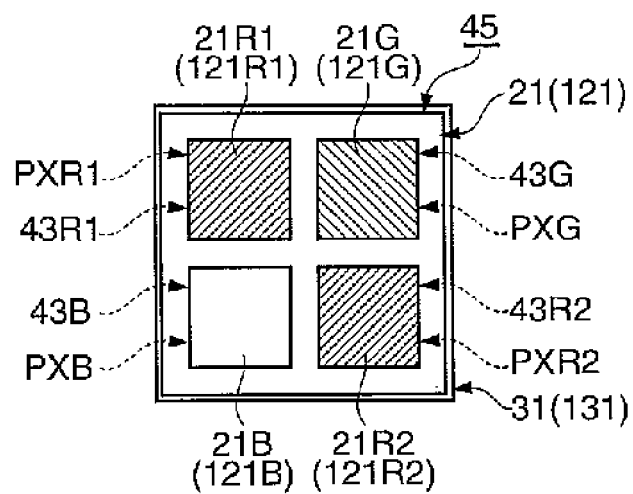
FIG. 15 is a plan view showing another structure of the polarizing element according to the invention.

For example, as shown in FIG. 15, a configuration in which four subpixels (a first red subpixel PXR1, a green subpixel PXG, a blue subpixel PXB, and a second red subpixel PXR2)

are arranged in one pixel of the liquid crystal display device 31, and the four subpixels are arranged in a matrix in one pixel may be adopted.

In this case, the color material layers of the color filter 43 are configured such that the first red subpixel PXR1 is disposed at a position overlapping with a red color material layer 43R1 in plan view, the green subpixel PXG is disposed at a position overlapping with a green color material layer 43G in plan view, the blue subpixel PXB is disposed at a position overlapping with a blue color material layer 43B in plan view, and the second red subpixel PXR2 is disposed at a position overlapping with a red color material layer 43R2 in plan view.

Further, the polarizing plate 45 is configured such that the first red subpixel PXR1 is disposed at a position overlapping with a polarizing section 21R1 in plan view, the green subpixel PXG is disposed at a position overlapping with a polarizing section 21G in plan view, the blue subpixel PXB is disposed at a position overlapping with a polarizing section 21B in plan view, and the second red subpixel PXR2 is disposed at a position overlapping with a polarizing section 21R2 in plan view.

In the configuration shown in FIG. 15, the first red subpixel PXR1 and the second red subpixel PXR2 are provided in one pixel of the liquid crystal display device 31, and therefore, the liquid crystal display device 31 has such a configuration that the polarizing section 21R1 corresponding to red color and the polarizing section 21R2 corresponding to red color are provided. In this case, if the specification of the polarizing section 21R1 is set to the same as that of the polarizing section 21R2, the production becomes easy.

If another configuration is adopted as the configuration such as the arrangement, shape, and color of the subpixels of the liquid crystal display device 31, the arrangement, shape, and color of the polarizing sections of the polarizing plate 45 may be changed so as to correspond to the arrangement, shape, and color of the subpixels. For example, if the red subpixel PXR1, the green subpixel PXG, the blue subpixel PXB, and the red subpixel PXR2 are formed into a square or a rectangle, the polarizing sections 21R1, 21G, 21B, and 21R2 of the polarizing plate 45 are formed into a square or a rectangle so that the shape thereof corresponds to that of the subpixels. By doing this, whatever configuration of the arrangement, shape, and color of the subpixels of the liquid crystal display device 31 is adopted, a liquid crystal display device which enables bright and high contrast display can be realized.

In the above embodiment, when setting the specification of the nanorods 40, as a method for realizing a polarizing element having excellent polarization properties with respect to a plurality of different wavelengths, the materials of the nanorods are selected according to the wavelengths, such as silver nanorods, gold nanorods, and gold core-silver shell nanorods. In place of this method, the aspect ratios of the nanorods may be selected according to the wavelengths. By changing the aspect ratios of the nanorods, the absorption peak wavelength can be shifted. Even by this method, a polarizing element having excellent polarization properties with respect to a plurality of different wavelengths can also be realized.

Further, in the above embodiment, as the material of the nanorods, gold and silver are used. However, this is not a limitation, and a semiconductor material may be used.

Further, in the above embodiment, by using three types of nanorods, the polarizing element 20 having absorption peaks in three wavelength ranges is realized, however, the invention is not limited thereto. For example, if an image display is constituted by four color light components such as red, green, blue, and yellow, four types of nanorods may be used so that the polarizing element has absorption peaks in four wavelength ranges according to these colors.

Further, even if an image display is constituted by three color light components, two types of nanorods maybe used so that the polarizing element has absorption peaks in two wavelength ranges. In this case, it is preferred that one wavelength range of the three wavelength ranges constituting the image display overlaps with either one of the two absorption peak wavelengths of the polarizing element.

Further, also the wavelength range is not limited to a blue wavelength range, a green wavelength range, and a red wavelength range. It is also possible to appropriately change the constituent material, the dimension, the production process, etc. of each constituent member of the polarizing element.

Further, in the above embodiment, the case where the dimension in the long axis direction of the nanorod 40, which is one of the specification items of the nanorod 40 is set to, for example, 15 to 40 nm is described by way of example. However, this is not a limitation, and the dimension in the long axis direction thereof may be set to 40 nm or more. For example, the dimension in the long axis direction of the silver nanorod 40B may be set to about 300 to 500 nm.

Further, for example, a configuration in which as the material of the nanorods to be used in the polarizing sections 21R and 21G on which light in a red wavelength range and a green wavelength range is incident, a metal other than gold or silver such as copper is used may be adopted.

For example, a configuration in which as the material of the nanorod 40 to be used in the polarizing section 21R, silver is used may be adopted. Further, for example, a configuration in which as the material of the nanorod 40 to be used in the polarizing section 21G, copper is used may be adopted. Further, for example, a configuration in which as the material of the nanorod 40 to be used in the polarizing section 21B, red phosphorus is used may be adopted.

In the case where the distribution density, which is one of the specification items of the nanorod 40 is set, in consideration of the fact that as the distribution density of the nanorod 40 is decreased, the transmittance is increased to decrease the degree of polarization, an optimal distribution density can be set in advance by, for example, an experiment, a simulation, or the like.

The distribution density of the nanorod 40 can be set for each of the polarizing sections 21R, 21G, and 21B. In the case where the distribution density of the nanorod 40 is adjusted for each of the polarizing sections 21R, 21G, and 21B, in the production process for the polarizing element 20, when the organic solvent solutions 61 to 63 are prepared, the amount of the nanorod 40 contained in the organic solvent per unit amount may be adjusted for each of the organic solvent solutions 61 to 63.

Further, in the above embodiment, a configuration in which the partition wall 22 is provided between the polarizing sections 21R, 21G, and 21B is described by way of example. However, this is not a limitation, and a configuration in which two polarizing sections adjacent to each other, for example, the polarizing sections 21R and 21G may be formed in contact with each other may be adopted. Alternatively, two polarizing sections adjacent to each other, for example, the polarizing sections 21R and 21G may be formed with a gap therebetween.

Modification Example

For example, in a cellular phone, as a display section 1301, the liquid crystal display device 131 described in the modification example of the third embodiment may be used. In this case, as the light absorbing material 41 contained in the polarizing section 121R1 and the light absorbing material 41 contained in the polarizing section 121R2, the red color material 41R is used.

What is claimed is:

1. A polarizing element comprising:
   a plurality of polarizing sections, wherein
   a first polarizing section included in the plurality of polarizing sections has a first base material and a plurality of first acicular particles dispersed in the first base material such that a long axis of each of the plurality of first acicular particles is aligned nearly in a first predetermined direction,
   a second polarizing section included in the plurality of polarizing sections has a second base material and a plurality of second acicular particles dispersed in the second base material such that a long axis of each of the plurality of second acicular particles is aligned nearly in a second predetermined direction, and
   a specification of one of the plurality of first acicular particles is different from a specification of one of the plurality of second acicular particles,
   wherein
      the specification of one of the plurality of first acicular particles is set according to light in a first wavelength range,
      the specification of one of the plurality of second acicular particles is set according to light in a second wavelength range different from the first wavelength range,
      the first polarizing section has a first light absorbing material which absorbs light in a wavelength range different from a first wavelength range,
      the second polarizing section has a second light absorbing material which absorbs light in a wavelength range different from a second wavelength range, and
      the second wavelength range is different from the first wavelength range.

2. The polarizing element according to claim 1, further including:
   a backing material which supports the plurality of polarizing sections, wherein
   a plurality of polarizing section groups each composed of the first polarizing section and the second polarizing section is arranged in a matrix on a surface of the backing material.

3. The polarizing element according to claim 1, wherein red light is incident on the first polarizing section, green light is incident on the second polarizing section, and the plurality of polarizing sections further includes a third polarizing section on which blue light is incident.

4. The polarizing element according to claim 1, wherein
   a third polarizing section included in the plurality of polarizing sections has a third light absorbing material which absorbs light in a wavelength range different from a third wavelength range, and
   the first wavelength range corresponds to red light, the second wavelength range corresponds to green light, and the third wavelength range corresponds to blue light.

5. The polarizing element according to claim 1, wherein the specification of the one of the plurality of first acicular particles is different from the specification of the one of the plurality of second acicular particles in at least one of a material, a distribution density, a diameter, and a dimension in the long axis direction.

6. The polarizing element according to claim 1, wherein the specification of the one of the plurality of first acicular particles is different from the specification of the one of the plurality of second acicular particles in at least one of a material, a distribution density, a diameter, and a dimension in the long axis direction.

7. A liquid crystal device comprising:
   a liquid crystal panel having a liquid crystal layer sandwiched between a pair of substrates; and
   the polarizing element according to claim 1.

8. A liquid crystal device comprising:
   a first pixel corresponding to a first color;
   a second pixel corresponding to a second color;
   a first polarizing section provided corresponding to the first pixel;
   a second polarizing section provided corresponding to the second pixel;
   a plurality of first acicular particles included in the first polarizing section; and
   a plurality of second acicular particles included in the second polarizing section; wherein
   a specification of one of the plurality of first acicular particles is different from a specification of one of the plurality of second acicular particles,
   wherein
      the specification of one of the plurality of first acicular particles is set according to light in a first wavelength range,
      the specification of one of the plurality of second acicular particles is set according to light in a second wavelength range different from the first wavelength range,
      the first polarizing section has a first light absorbing material which absorbs light in a wavelength range different from a first wavelength range,
      the second polarizing section has a second light absorbing material which absorbs light in a wavelength range different from a second wavelength range, and
      the second wavelength range is different from the first wavelength range.

9. The liquid crystal device according to claim 8, wherein the specification of the one of the plurality of first acicular particles is different from the specification of the one of the plurality of second acicular particles in at least one of a material, a distribution density, a diameter, and a dimension in the long axis direction.

10. The liquid crystal device according to claim 8, wherein the specification of the one of the plurality of first acicular particles is different from the specification of the one of the plurality of second acicular particles in at least one of a material, a distribution density, a diameter, and a dimension in the long axis direction.

11. An electronic apparatus comprising the liquid crystal device according to claim 1.

12. The polarizing element of claim 1, further comprising a partition wall disposed between the first polarizing section and the second polarizing section.

13. The polarizing element of claim 8, further comprising a partition wall disposed between the first polarizing section and the second polarizing section.

* * * * *